(12) United States Patent
Clever et al.

(10) Patent No.: US 8,028,666 B2
(45) Date of Patent: Oct. 4, 2011

(54) CONCENTRIC CAMSHAFT WITH BEARING SLEEVE AND METHOD OF DEBRIS REMOVAL

(75) Inventors: Glenn E. Clever, Washington, MI (US); Roy Glenn Kaywood, Jackson, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 557 days.

(21) Appl. No.: 12/046,884

(22) Filed: Mar. 12, 2008

(65) Prior Publication Data

US 2009/0229550 A1 Sep. 17, 2009

(51) Int. Cl.
*F01L 1/34* (2006.01)
(52) U.S. Cl. ............... 123/90.17; 123/90.6; 29/888.1
(58) Field of Classification Search ............ 123/90.6, 123/90.16; 29/888.1; 74/567
See application file for complete search history.

(56) References Cited

U.S. PATENT DOCUMENTS

| | | | |
|---|---|---|---|
| 4,597,365 A | | 7/1986 | Madaffer |
| 5,201,246 A | * | 4/1993 | Arnold et al. ............... 74/567 |
| 5,359,970 A | * | 11/1994 | Krebs ..................... 123/90.17 |
| 5,392,511 A | * | 2/1995 | Copeland et al. ............ 29/888.1 |
| 5,402,759 A | * | 4/1995 | Ding et al. ................ 123/182.1 |
| 5,664,463 A | * | 9/1997 | Amborn et al. ............... 74/567 |
| 6,182,362 B1 | | 2/2001 | Lancefield |
| 6,247,436 B1 | | 6/2001 | Lancefield et al. |
| 6,253,719 B1 | | 7/2001 | Methley |
| 6,725,817 B2 | | 4/2004 | Methley et al. |
| 6,725,818 B2 | | 4/2004 | Methley |
| 7,210,440 B2 | * | 5/2007 | Lawrence et al. ............ 123/90.6 |
| 7,610,890 B2 | * | 11/2009 | Lettmann et al. ............ 123/90.6 |
| 2005/0226736 A1 | | 10/2005 | Lancefield et al. |
| 2006/0185471 A1 | | 8/2006 | Lawrence et al. |
| 2006/0207538 A1 | | 9/2006 | Lancefield et al. |
| 2007/0119402 A1 | | 5/2007 | Lancefield et al. |

FOREIGN PATENT DOCUMENTS

| | | |
|---|---|---|
| EP | 1473443 | 3/2004 |
| WO | WO2006/067519 | 6/2006 |
| WO | WO2006/097767 | 9/2006 |
| WO | WO2007/052075 | 5/2007 |

* cited by examiner

*Primary Examiner* — Kenneth Bomberg
*Assistant Examiner* — Daniel Bernstein
(74) *Attorney, Agent, or Firm* — Harness, Dickey & Pierce, P.L.C.

(57) ABSTRACT

A camshaft may include a first shaft, a bearing sleeve member located on and fixed to the first shaft, and a first lobe member located on the first shaft and displaceable between first and second positions. The first lobe member may be axially offset relative to the bearing sleeve member when in the first position to allow for machining of an outer surface of the bearing sleeve member and removal of machining debris from the outer surface. The first lobe member may be axially aligned with and bearingly supported on the bearing sleeve member when in the second position.

17 Claims, 3 Drawing Sheets

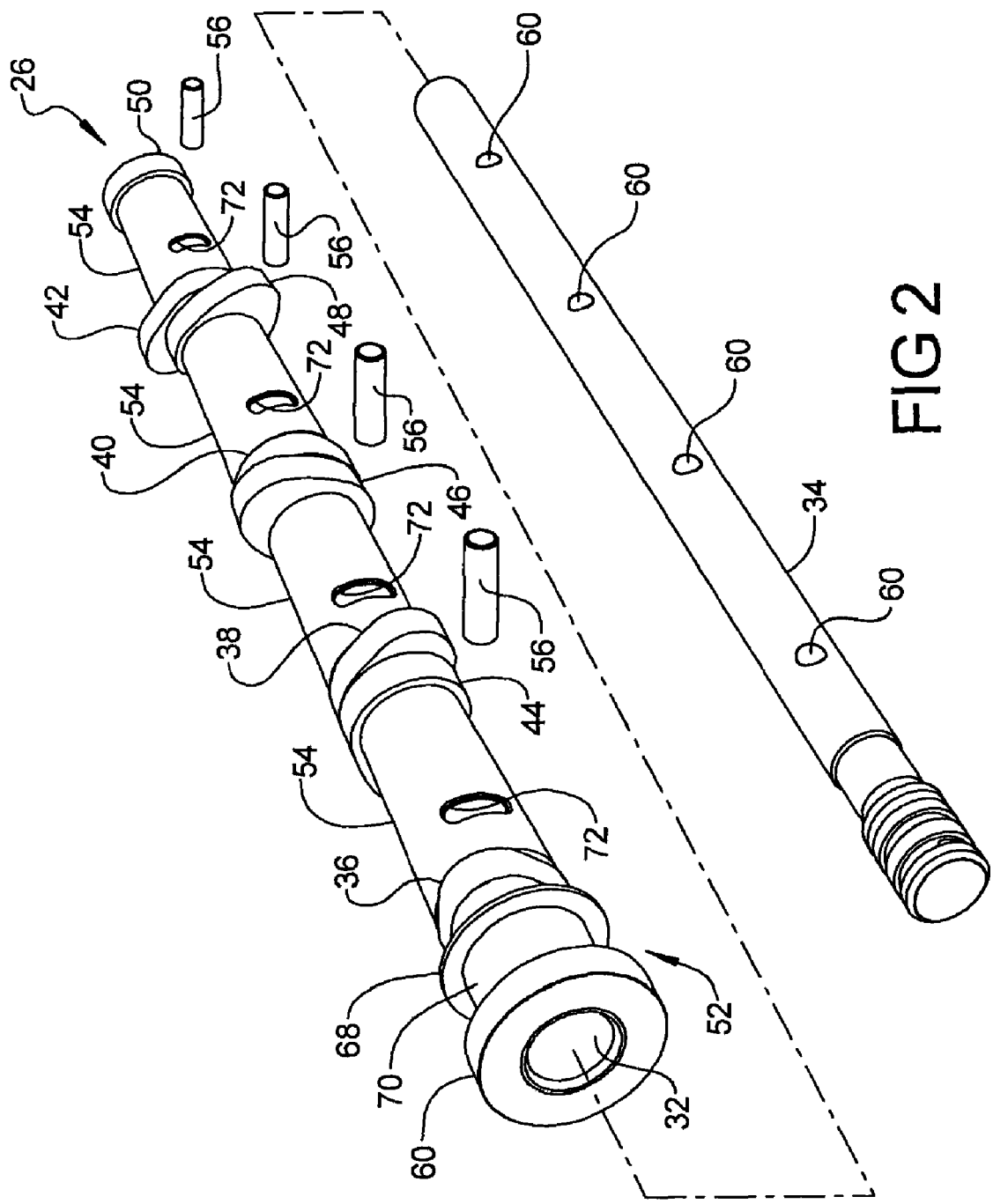

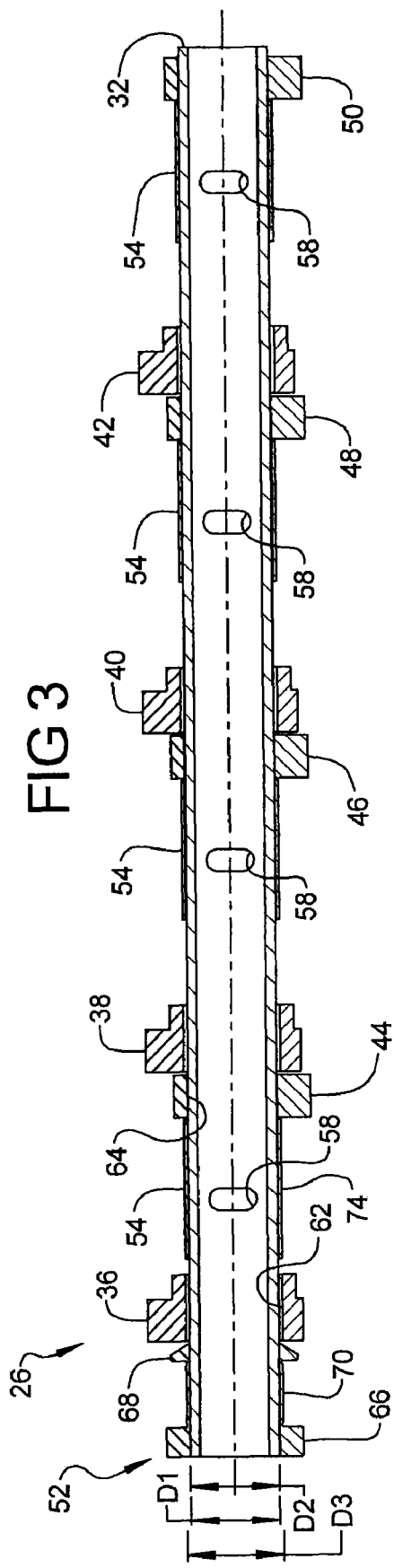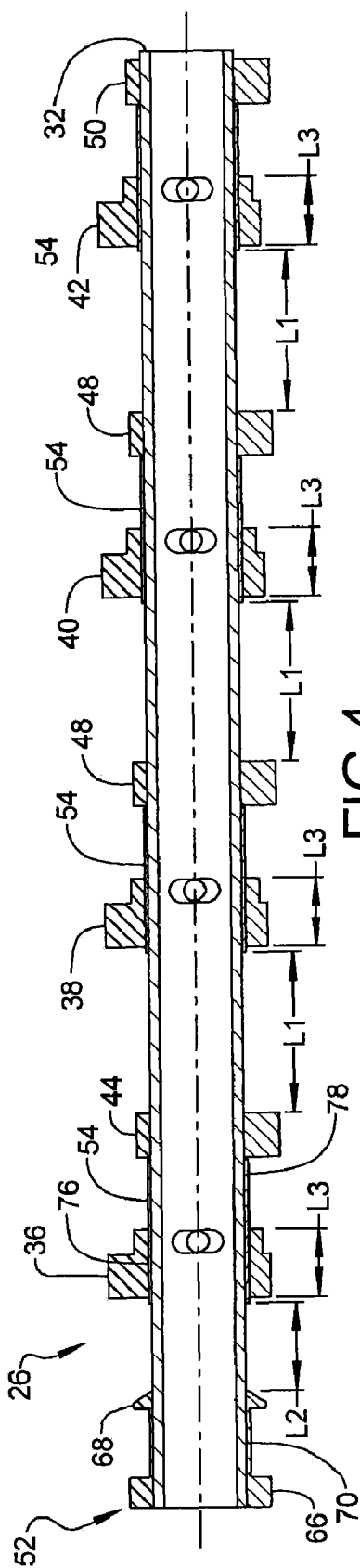

CONCENTRIC CAMSHAFT WITH BEARING SLEEVE AND METHOD OF DEBRIS REMOVAL

FIELD

The present disclosure relates to engine camshaft assemblies, and more specifically to concentric camshaft assemblies.

BACKGROUND

The statements in this section merely provide background information related to the present disclosure and may not constitute prior art.

Engines typically include a camshaft to actuate intake and exhaust valves. Some camshafts are concentric camshafts that provide for relative rotation between the intake and exhaust lobes. The intake lobes may be fixed to an outer shaft for rotation with the shaft and the exhaust lobes may be rotatably supported on the shaft. Alternatively, the exhaust lobes may be fixed to the outer shaft for rotation with the shaft and the intake lobes may be rotatably supported on the shaft. In either arrangement, the lobes that are rotatably supported on the shaft may use an outer surface of the shaft as a bearing surface.

SUMMARY

A camshaft may include a first shaft, a bearing sleeve member located on and fixed to the first shaft, and a first lobe member located on the first shaft and displaceable between first and second positions. The first lobe member may be axially offset relative to the bearing sleeve member when in the first position to allow for machining of an outer surface of the bearing sleeve member and removal of machining debris from the outer surface. The first lobe member may be axially aligned with and bearingly supported on the bearing sleeve member when in the second position.

An engine assembly may include an engine structure, a camshaft supported on the engine structure, and a cam phaser coupled to the camshaft. The camshaft may include a first shaft, a bearing sleeve member located on and fixed to the first shaft, and a first lobe member located on the first shaft and displaceable between first and second positions. The first lobe member may be axially offset relative to the bearing sleeve member when in the first position to allow for machining of an outer surface of the bearing sleeve member and removal of machining debris from the outer surface. The first lobe member may be axially aligned with and bearingly supported on the bearing sleeve member when in the second position. The cam phaser may be coupled to the camshaft and may selectively rotate the first lobe member on the bearing sleeve member when the first lobe member is in the second position.

A method may include fixing a first lobe member to a first shaft of an engine camshaft, fixing a bearing sleeve member to the first shaft, locating a second lobe member on the first shaft, fixing a third lobe member on the first shaft after the locating. The second lobe member may be disposed between the first and third lobe members. The method may further include displacing the second lobe member axially with respect to the bearing sleeve member to expose an outer surface of the bearing sleeve member and performing a finishing process on the outer surface of the second lobe member after the displacing.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a perspective exploded view of the camshaft of FIG. 1;

FIG. 3 is a section view of the camshaft of FIG. 1 showing a lobe member in a first orientation; and FIG. 4 is a section view of the camshaft of FIG. 1 showing a lobe member in a second orientation.

DETAILED DESCRIPTION

Figure 1:
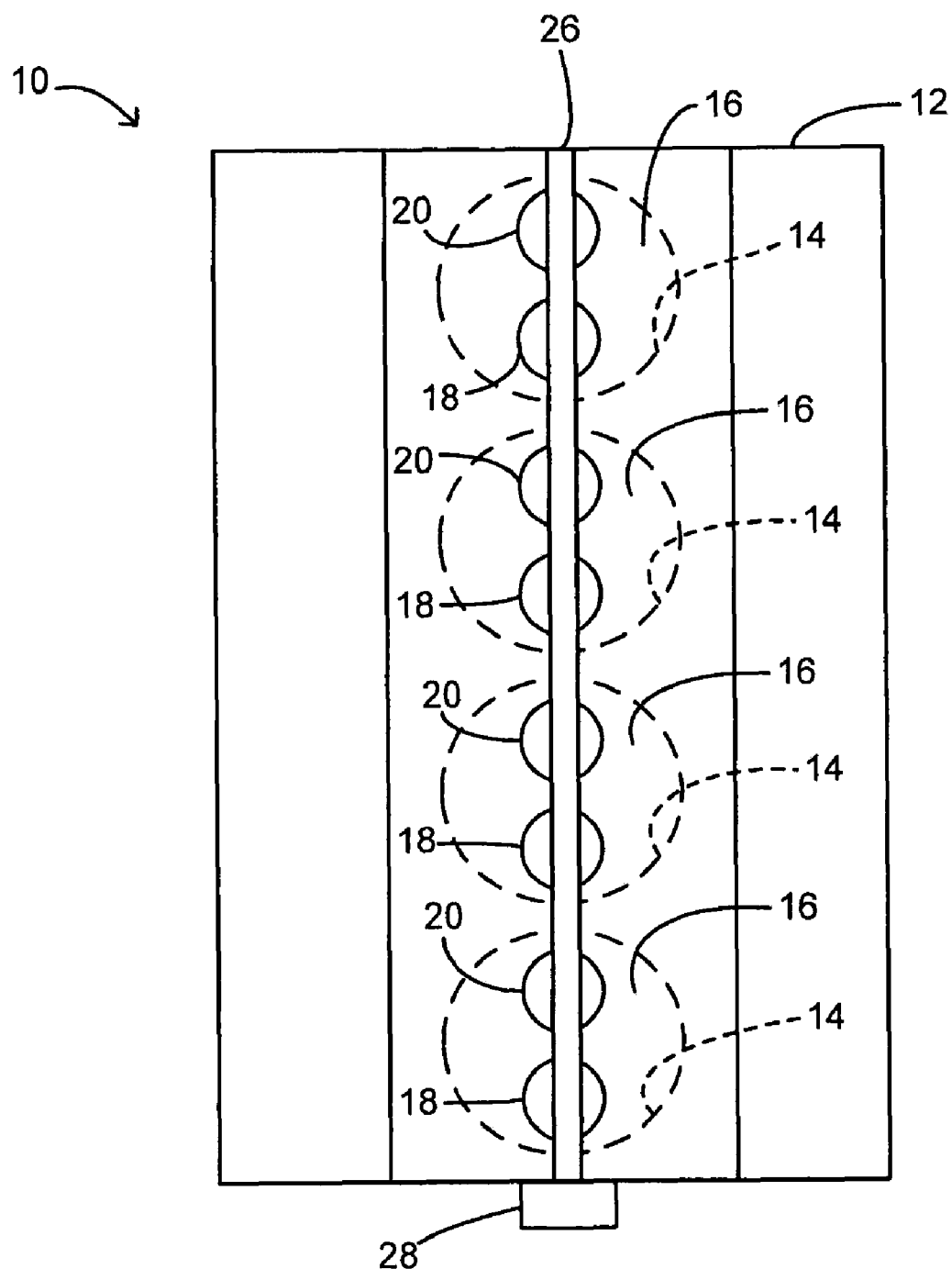
FIG. 1 is a schematic illustration of an engine assembly according to the present disclosure.

The following description is merely exemplary in nature and is not intended to limit the present disclosure, application, or uses. It should be understood that throughout the drawings, corresponding reference numerals indicate like or corresponding parts and features.

Referring now to FIG. 1, an exemplary engine assembly 10 is schematically illustrated. The engine assembly 10 may include an engine 12 including a plurality of cylinders 14 having pistons 16 disposed therein. The engine 12 may further include an intake valve 18 and an exhaust valve 20 for each cylinder 14, as well as a camshaft 26 and a cam phaser 28. While the engine assembly 10 is illustrated as a single overhead cam engine, it is understood that the present disclosure may be applicable to a variety of other engine configurations as well.

With reference to FIGS. 2-4, the camshaft 26 may include first and second shafts 32, 34, a first set of lobe members 36, 38, 40, 42, a second set of lobe members 44, 46, 48, 50, a locating member 52, bearing sleeves 54, and drive pins 56. In the present example, the first set of lobe members 36, 38, 40, 42 may form an intake lobe set and the second set of lobe members 44, 46, 48, 50 may form an exhaust lobe set. However, it is understood that alternate arrangements may be provided where the first set of lobe members 36, 38, 40, 42 may form an exhaust lobe set and the second set of lobe members 44, 46, 48, 50 may form an intake lobe set.

The second shaft 34 may be rotatably disposed within the first shaft 32. The first shaft 32 may include slots 58 therethrough and the second shaft 34 may include apertures 60. The pins 56 may extend through the slots 58 and apertures 60 and may be engaged with the second set of lobe members 44, 46, 48, 50 to couple the first set of lobe members 36, 38, 40, 42 for rotation with the second shaft 34. The slots 58 in the first shaft 32 may generally allow for a rotational travel of the pins 56 therein.

The second set of lobe members 44, 46, 48, 50 may be fixed for rotation with the first shaft 32. The engagement between the second set of lobe members 44, 48, 50, 52 and the first shaft 32 may include a friction fit engagement. The first set of lobe members 36, 38, 40, 42 may be similar to one another. The second set of lobe members 44, 46, 48, 50 may additionally be similar to one another. Therefore, the lobe member 36 will be described with the understanding that the description applies equally to the remainder of the first set of lobe members 38, 40, 42 and lobe member 44 will be described with the understanding that the description applies equally to the remainder of the second set of lobe members 46, 48, 50. The lobe member 36 may include a bore 62 defining a first inner diameter (D1) and the lobe member 44 may include a bore 64 defining a second inner diameter (D2). The second diameter (D2) may be less than the first diameter (D1).

The locating member 52 may be fixed to an end of the first shaft 32 near the cam phaser 28. The locating member 52 may be fixed to the first shaft 32 in a manner similar to the second set of lobe members 44, 46, 48, 50, such as through a friction fit engagement. The locating member 52 may include first and second end portions 66, 68 and a bearing portion 70 extending between the first and second end portions 66, 68. The bearing portion 70 may be rotatably supported by the engine 12 and the first and second end portions 66, 68. The first end portion 66 may be coupled to the cam phaser 28 and the second end portion 68 may form a stop, as discussed below.

The bearing sleeves 54 may be fixed to first shaft 32 and may include a slot 72 generally aligned with the slot 58 in the first shaft 32. The bearing sleeve 54 may include an outer surface 74 defining an outer diameter (D3) that is greater than the first inner diameter (D1) and less than the second inner diameter (D2). The bearing sleeve 54 may include first and second portions 76, 78. The lobe member 36 may be rotatably disposed on the first portion 76. The second portion 78 may extend axially from the first portion 76 and the lobe member 44 to form a bearing surface for the camshaft 26. The axial spacing (L1) between adjacent ones of the bearing sleeves 54 and the second set of lobe members 44, 46, 48, 50 and the axial spacing (L2) between the bearing sleeve 54 and the locating member 52 may each be greater than the axial extent (L3) of each of the first set of lobe members 36, 38, 40, 42.

With reference to FIGS. 3 and 4, assembly of the camshaft 26 will now be discussed. The first set of lobe members 36, 38, 40, 42, the second set of lobe members 44, 46, 48, 50, the locating member 52, and the bearing sleeves 54 may be located on the first shaft 32 in the arrangement shown in FIG. 3 where the first set of lobe members 36, 38, 40, 42 are displaced from the bearing sleeves 54 to expose the outer surfaces 74. The first set of lobe members 36, 38, 40, 42 and the second set of lobe members 44, 46, 48, 50 may be completely finished (i.e., no more machining processes required) before being placed on the first shaft 32. Next, the second set of lobe members 44, 46, 48, 50, the locating member 52, and the bearing sleeves 54 may be fixed to the first shaft 32. The second set of lobe members 44, 46, 48, 50 the locating member 52, and the bearing sleeves 54 may be fixed to the first shaft 32 in a variety of ways. For example, a radially outward force may be applied from within the first shaft 32 to provide the frictional engagement between the second set of lobe members 44, 46, 48, 50, the locating member 52, and the bearing sleeves 54 and the first shaft 32. The radially outward force may be applied in a variety of ways including a ballizing process.

Once the second set of lobe members 44, 46, 48, 50 the locating member 52, and the bearing sleeves 54 are fixed to the first shaft 32, the outer surfaces 74 of the bearing sleeves 54 may be machined to a desired finish. The machining may include grinding the outer surfaces 74 to the desired finish. The first set of lobe members 36, 38, 40, 42 may be isolated from the bearing sleeves 54 during the machining process, preventing exposure of the bore 62 of the first set of lobe members 36, 38, 40, 42 to debris from the machining operation. Once the machining operation is completed, the debris may then be cleaned from the outer surfaces 74 of the bearing sleeves 54. The first set of lobe members 36, 38, 40, 42 may then be located on the bearing sleeves 54 and fixed to the second shaft 34 for rotation on the bearing sleeves 54.

What is claimed is:

1. A camshaft comprising:
a first shaft including a bore therethrough;
a second shaft disposed within the bore for rotation relative to the first shaft;
a bearing sleeve member located on and fixed to the first shaft; and
a first lobe member located on the first shaft, rotatable relative to the bearing sleeve member and displaceable between first and second positions, the first lobe member being axially offset relative to the bearing sleeve member when in the first position to allow for machining of an outer surface of the bearing sleeve member and removal of machining debris from the outer surface, the first lobe member being axially aligned with and bearingly supported for rotation on the bearing sleeve member and fixed for rotation with the second shaft when in the second position.

2. The camshaft of claim 1, further comprising a second lobe member that is fixed to the first shaft, the first lobe member being displaced toward the second lobe member when in the first position.

3. The camshaft of claim 2, wherein the second lobe member includes an inner diameter and the bearing sleeve member includes an outer diameter that is greater than the inner diameter.

4. The camshaft of claim 3, wherein an inner diameter of the first lobe member is greater than the inner diameter of the second lobe member and the outer diameter of the bearing sleeve member.

5. The camshaft of claim 2, wherein a distance between the second lobe member and the bearing sleeve member is at least equal to an axial extent of the first lobe member to allow an entire outer surface of the bearing sleeve member to be exposed when the first lobe member is in the first position.

6. The camshaft of claim 1, wherein the first shaft includes a first slot extending therethrough and the bearing sleeve member includes a second slot extending therethrough and aligned with the first slot, the first lobe member being coupled to the second shaft through the first and second slots.

7. The camshaft of claim 1, wherein a portion of the bearing sleeve extends axially from the first lobe member to form a bearing surface for rotation of the first shaft.

8. The camshaft of claim 1, wherein the bearing sleeve member is located radially between the first shaft and the first lobe member.

9. The camshaft of claim 8, wherein the first lobe member defines a bore and the bearing sleeve member is located within the bore when the first lobe member is in the second position.

10. An engine assembly comprising:
an engine structure;
a camshaft supported on the engine structure and including:
a first shaft including a bore therethrough;
a second shaft disposed within the bore for rotation relative to the first shaft;
a bearing sleeve member located on and fixed to the first shaft; and
a first lobe member located on the first shaft and displaceable between first and second positions, the first lobe member being axially offset relative to the bearing sleeve member when in the first position to allow for machining of an outer surface of the bearing sleeve member and removal of machining debris from the outer surface, the first lobe member being axially aligned with and bearingly supported on the bearing sleeve member and fixed for rotation with the second shaft when in the second position; and a cam phaser coupled to the camshaft that selectively rotates the first lobe member on the bearing sleeve member when the first lobe member is in the second position.

11. The engine assembly of claim 10, further comprising a second lobe member that is fixed to the first shaft, the first lobe member being displaced toward the second lobe member when in the first position.

12. The engine assembly of claim 11, wherein the second lobe member includes an inner diameter and the bearing sleeve member includes an outer diameter that is greater than the inner diameter.

13. The engine assembly of claim 12, wherein an inner diameter of the first lobe member is greater than the inner diameter of the second lobe member and the outer diameter of the bearing sleeve member.

14. The engine assembly of claim 11, wherein a distance between the second lobe member and the bearing sleeve member is at least equal to an axial extent of the first lobe member to allow an entire outer surface of the bearing sleeve member to be exposed when the first lobe member is in the first position.

15. The engine assembly of claim 10, wherein the bearing sleeve member is located radially between the first shaft and the first lobe member.

16. The engine assembly of claim 15, wherein the first lobe member defines a bore and the bearing sleeve member is located within the bore when the first lobe member is in the second position.

17. The engine assembly of claim 10, wherein the first shaft includes a first slot extending therethrough and the bearing sleeve includes a second slot extending therethrough and aligned with the first slot, the first lobe member being coupled to the second shaft through the first and second slots.

* * * * *